United States Patent
Dong et al.

(10) Patent No.: US 10,761,724 B2
(45) Date of Patent: Sep. 1, 2020

(54) SYSTEM, METHOD, AND APPARATUS FOR UPDATING DATA IN A DISTRIBUTED STORAGE SYSTEM

(71) Applicant: ALIBABA GROUP HOLDING LIMITED, George Town, Grand Cayman (KY)

(72) Inventors: Yuanyuan Dong, Hangzhou (CN); Li Xu, Hangzhou (CN); Weibin Yan, Hangzhou (CN); Kai Li, Hangzhou (CN); Puyuan Yang, Hangzhou (CN); Yemin Sui, Hangzhou (CN)

(73) Assignee: ALIBABA GROUP HOLDING LIMITED, George Town, Grand Cayman (KY)

( * ) Notice: Subject to any disclaimer, the term of this patent is extended or adjusted under 35 U.S.C. 154(b) by 0 days.

(21) Appl. No.: 15/098,132

(22) Filed: Apr. 13, 2016

(65) Prior Publication Data
US 2016/0320974 A1    Nov. 3, 2016

(30) Foreign Application Priority Data
Apr. 30, 2015    (CN) .......................... 2015 1 0213538

(51) Int. Cl.
*G06F 3/06*    (2006.01)
*H04L 29/08*    (2006.01)

(52) U.S. Cl.
CPC ............ *G06F 3/0604* (2013.01); *G06F 3/064* (2013.01); *G06F 3/067* (2013.01); *H04L 67/1097* (2013.01)

(58) Field of Classification Search
CPC .................................................... G06F 3/0604
See application file for complete search history.

(56) References Cited

U.S. PATENT DOCUMENTS

| | | | | |
|---|---|---|---|---|
| 2003/0233442 A1* | 12/2003 | Futatsugi | ............ | H04L 41/0893 709/223 |
| 2004/0064633 A1* | 4/2004 | Oota | .................... | G06F 3/0613 711/100 |
| 2006/0149740 A1* | 7/2006 | Tsutazawa | .............. | H04L 51/04 |

(Continued)

FOREIGN PATENT DOCUMENTS

| | | |
|---|---|---|
| CN | 103036717 A | 4/2013 |
| CN | 103294675 A | 9/2013 |
| CN | 103379129 A | 10/2013 |

OTHER PUBLICATIONS

PCT International Search Report and Written dated Jul. 18, 2016, issued in corresponding International Application No. PCT/US16/27322 (7 pages).

(Continued)

*Primary Examiner* — Suraj M Joshi
(74) *Attorney, Agent, or Firm* — Finnegan, Henderson, Farabow, Garrett & Dunner, LLP (57) ABSTRACT

A method for updating data in a distributed storage system is disclosed. The method may comprise receiving, by a sender terminal device, an update request; obtaining, by the sender terminal device, update data and control information from the update request; sending, by the sender terminal device, the update data, via a data update request, to a receiver terminal device; and sending, by the sender terminal device, the control information, via a control information update request, to the receiver terminal device.

18 Claims, 4 Drawing Sheets

(56) References Cited

U.S. PATENT DOCUMENTS

2011/0289058 A1* 11/2011 Anzai .............. G06F 17/30067
  707/650
2014/0207913 A1* 7/2014 Maddah-Ali ..... H04L 29/08729
  709/219

OTHER PUBLICATIONS

First Chinese Office Action issued in Chinese Application No. CN201510213538.5, dated Nov. 5, 2018, 8 pages.
First Chinese Search Report issued in Chinese Application No. CN201510213538.5, dated Oct. 25, 2016, 1 page.

* cited by examiner

SYSTEM, METHOD, AND APPARATUS FOR UPDATING DATA IN A DISTRIBUTED STORAGE SYSTEM

CROSS REFERENCE TO RELATED APPLICATION

The present application is based on and claims the benefits of priority to Chinese Application No. 201510213538.5, filed Apr. 30, 2015, the entire contents of which are incorporated herein by reference.

TECHNICAL FIELD

The present application relates to methods, apparatus, and systems for updating data in a distributed storage system.

BACKGROUND

In distributed storage systems, each data block may be stored as multiple replicates and when the data block is updated, the same update needs to be implemented among the replicates as well. The update among replicates can be implemented by a coordinator. In a master-slave replication system, the coordinator can be a master server and update process can be: the coordinator sequences updates data blocks, assigns new data versions, generates update requests, and sends the requests to slave servers. The update request can comprise two parts: data update and control information update. The control information update includes the new data version and metadata of the data block, such as a data block identification, the original version of the data block, the new version of the data block, and metadata information for other slave servers. Each slave server receives and processes the update request and then replies to the coordinator. The coordinator determines, according to a number of normal responses from the slave servers, the number of update requests sent, and a data consistency protocol, whether the data update is successful. If yes, it will modify the data block to the new version.

In the process of updating the data, the new version is generated based on the current version of the data block. Thus, the version monotonically increases and only one latest version is included in the update requests. If, instead, the slave server receives update requests including multiple new versions, the complexity will increase for maintaining consistency in updating the data. Therefore, in the update process, if the coordinator receives multiple update requests to the same data block, the request has to be queued and only after completing a current update request, it will process the next.

In order to achieve consistency in updating replicates of the data block, update requests of the same data block are sequenced, i.e., in serial execution of the data update requests. The data update process includes: network transmission, logic processing of the request, and write disk IO parts. At present, the disk can be solid state discs (SSD) and cluster write performance is relatively high. But carrying, in an update request, multiple data updates as batch processing can have the data update requests processed at once, reducing delay in the logic processing. The main bottleneck of data updates is in transmission network: the batch processing contains multiple updates and the amount of data transmission is large, causing a significant transmission delay.

SUMMARY

One aspect of the present disclosure is directed to a method for updating data in a distributed storage system. The method may comprise receiving, by a sender terminal device, an update request; obtaining, by the sender terminal device, update data and control information from the update request; sending, by the sender terminal device, the update data, via a data update request, to a receiver terminal device; and sending, by the sender terminal device, the control information, via a control information update request, to the receiver terminal device.

Another aspect of the present disclosure is directed to a method for updating data in a distributed storage system. The method may comprise receiving, by the receiver terminal device, a data update request from a sender terminal device;setting, by the receiver terminal device, corresponding relations among a data block identification, a new data table identification, and new data in a data update relation table; receiving, by the receiver terminal device, a control information update request corresponding to the data update request from the sender terminal device; obtaining, by the receiver terminal device, the new data corresponding to the data block identification and the new data table identification carried by the control information update request from the data update relation table; and updating, by the receiver terminal device, the data based on the control information update request and the obtained new data.

Another aspect of the present disclosure is directed to an apparatus, implemented as a sender terminal device, for updating data in a distributed storage system. The apparatus may comprise a receiving module configured to receive an update request and to obtain update data and control information from the update request, and a sending module configured to send the update data, via a data update request, to a receiver terminal device and to send the control information, via a control information update request, to the receiver terminal device.

Another aspect of the present disclosure is directed to an apparatus, implemented as a receiver terminal device, for updating data in a distributed storage system. The apparatus may comprise a receiver module configured to receive a data update request from a sender terminal device and to receive a control information update request corresponding to the data update request from the sender terminal device, a setting module configured to set corresponding relations among a data block identification, a new data table identification, and new data in a data update relation table, an obtaining module configured to obtain the new data corresponding to the data block identification and the new data table identification carried by the control information update request from the data update relation table, and an updating module configured to update the data based on the control information update request and the obtained new data.

Another aspect of the present disclosure is directed to a non-transitory computer-readable medium storing one or more programs, the one or more programs comprising instructions which, when executed by a processor of a computer system, cause the computer system to perform a method. The method may comprise receiving, by the computer system, an update request; obtaining, by the computer system, update data and control information from the update request; sending, by the computer system, the update data, via a data update request, to a receiver terminal device; and sending, by the computer system, the control information, via a control information update request, to the receiver terminal device.

Another aspect of the present disclosure is directed to a non-transitory computer-readable medium storing one or more programs, the one or more programs comprising instructions which, when executed by a processor, cause the computer system to perform a method. The method may comprise receiving, by the receiver terminal device, a data update request from a sender terminal device; setting, by the receiver terminal device, corresponding relations among a data block identification, a new data table identification, and new data in a data update relation table; receiving, by the receiver terminal device, a control information update request corresponding to the data update request from the sender terminal device; obtaining, by the receiver terminal device, the new data corresponding to the data block identification and the new data table identification carried by the control information update request from the data update relation table; and updating, by the receiver terminal device, data based on the control information update request and the obtained new data.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1:
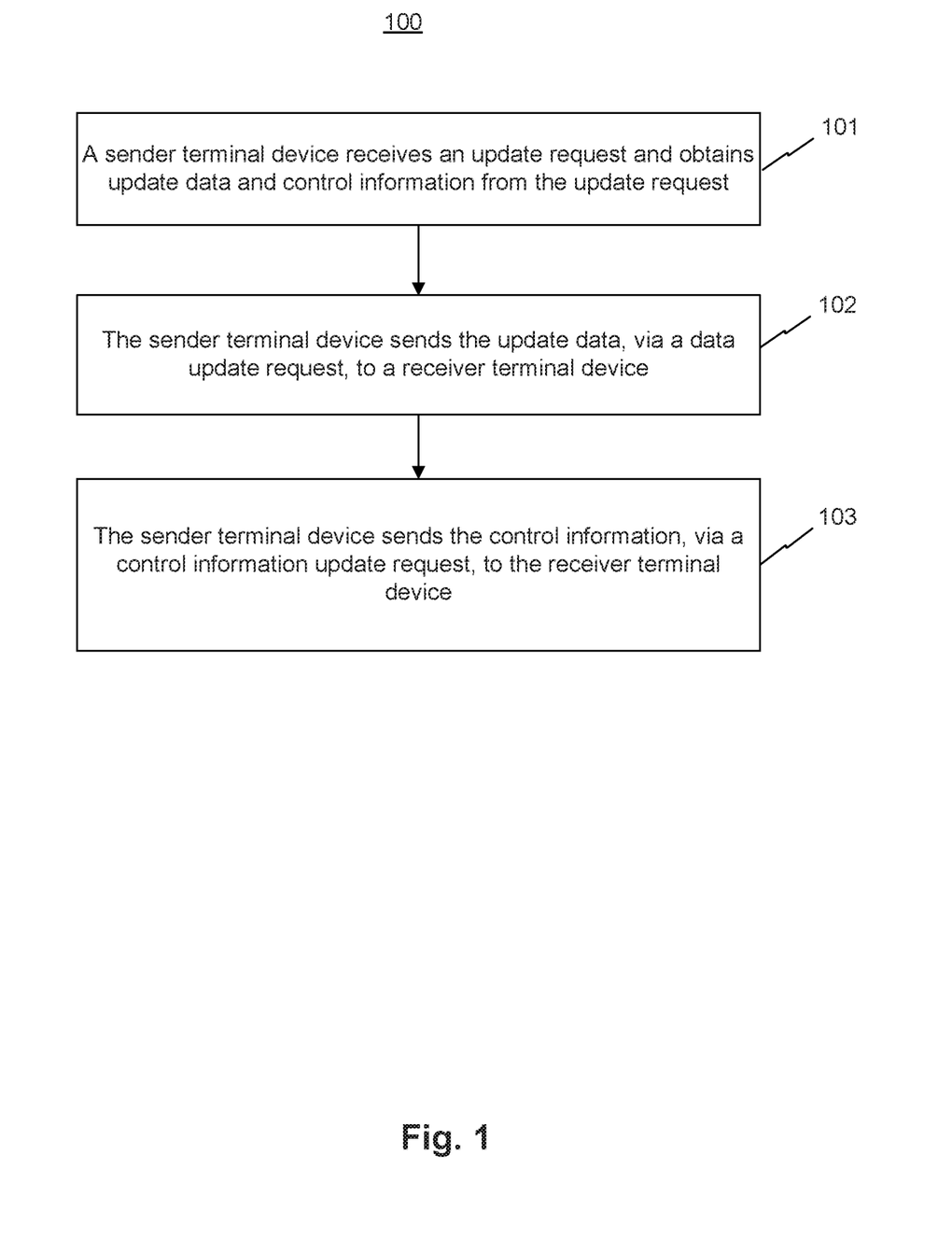
FIG. 1 is a flow diagram illustrating a method for updating data in a distributed storage system, according to an exemplary embodiment.

FIG. 1 is a flow diagram illustrating a method 100 for updating data in a distributed storage system, according to an exemplary embodiment.

At step 101, a sender terminal device receives an update request and obtains update data and control information from the update request. The update request may include a data block identification. In one embodiment, when the sender terminal device determines that a number of update requests corresponding to the data block exceeds a predetermined threshold, the sender terminal device obtains the update data and the control information.

For example, the update data and the control information may be both from the same update request, i.e., corresponding to the data block identification. The update request may comprise the data block identification of the data block to be updated. All update requests received by the sender terminal device may be stored in a queue. When the sender terminal device determines that the number of update requests corresponding to the data block exceeds the predetermined threshold, the sender terminal device may obtain the update data and the control information.

At step 102, the sender terminal device sends the update data, via a data update request, to a receiver terminal device. The update data, to be sent to the receiver terminal device, may include the data block identification, new data table identification, and new data. The new data table identification may be configured by the sender terminal device. The new data table identification may be configured to uniquely identify or correspond to the data update request.

The sender terminal device may save the new data table identification, carried by the data update request, to a table of sent items and may, in the future, retrieve the new data table identification from the table of sent items.

After sending the data update request, the sender terminal device may save the new data table identification to the table of sent items, so that it may retrieve the new data table identification from the table of sent items for sending the data update request in the future.

In some embodiments, the update data may comprise multiple pieces of sub-data. The sender terminal device may send the multiple pieces of sub-data to the receiver terminal device respectively via multiple data update requests. Each of the multiple data update requests may carry a new data table identification. The sender terminal device may first receive the multiple pieces of sub-data, each piece of the sub-data comprising the same data block identification and corresponding new data. The new data table identification and the new data may be uniquely associated with the data update request. After sending the data update requests, the sender terminal device may save the new data table identifications to the table of sent items. For example, the data update request, comprising the data block identification, new data table identification, and the new data sent by the sender terminal device, may be illustrated in the following table. Data update request 1 may carry data block identification 1, new data table identification 1.0, and new data 1. Data update request 2 may carry data block identification 1, new data table identification 1.1, and new data 2. Data update request 3 may carry data block identification 1, new data table identification 1.2, and new data 3. Data update request 4 may carry data block identification 1, new data table identification 1.3, and new data 4. Thus, the same data block identification, but different new data table identifications and different new data are carried by the data update requests. The new data table identifications may be saved in the table of sent items.

| Data update request | Data block identification | New data table identification | New data |
|---|---|---|---|
| Data update request 1 | Data block identification 1 | 1.0 | New data 1 |
| Data update | Data block identification 1 | 1.1 | New data 2 |

-continued

| Data update request | Data block identification | New data table identification | New data |
|---|---|---|---|
| request 2 | | | |
| Data update request 3 | Data block identification 1 | 1.2 | New data 3 |
| Data update request 4 | Data block identification 1 | 1.3 | New data 4 |

At step 103, the sender terminal device sends the control information, via a control information update request, to the receiver terminal device. The control information, to be sent to the receiver terminal device, may include a data block identification, a new data table identification, and new version information. The new data table identification can be obtained from the table of sent items. This method applies similarly to multiple new data table identifications. For example, if the new data table identifications save in the table of sent items are 1.0, 1.1, 1.2, and 1.3, the new data table identifications carried by the sender terminal device via the control information update request are 1.0, 1.1, 1.2, and 1.3, as shown in the following table.

| Control information update request | Data block identification | New data table identification |
|---|---|---|
| Control information update request | 1 | 1.0, 1.1, 1.2, 1.3 |

In some embodiments, if the sender terminal device receives a message corresponding to the data block identification, indicating that the data block has finished updating, and if some of the data update requests have not been sent, the sender terminal device may continue sending the remaining data update requests to the receiver terminal device. Also, the sender terminal device may combine the remaining data update requests and remaining control information update requests into correspondingly restored update requests and may send the restored update requests to the receiver terminal device.

Consistent with exemplary embodiments of this disclosure, the sender terminal device can receive the update request and obtain update data and control information from the update request. The sender terminal device may send the update data, via a data update request, to the receiver terminal device. The sender terminal device may send the control information, via a control information update request, to the receiver terminal device. The update data and the control information may be sent separately. The update data of the update request can be sent to the receiver terminal device while data is updated in the receiver terminal device. This method can significantly lower wait time in transferring data during updates, therefore lowering update delay time and enhancing system performances.

Figure 2:
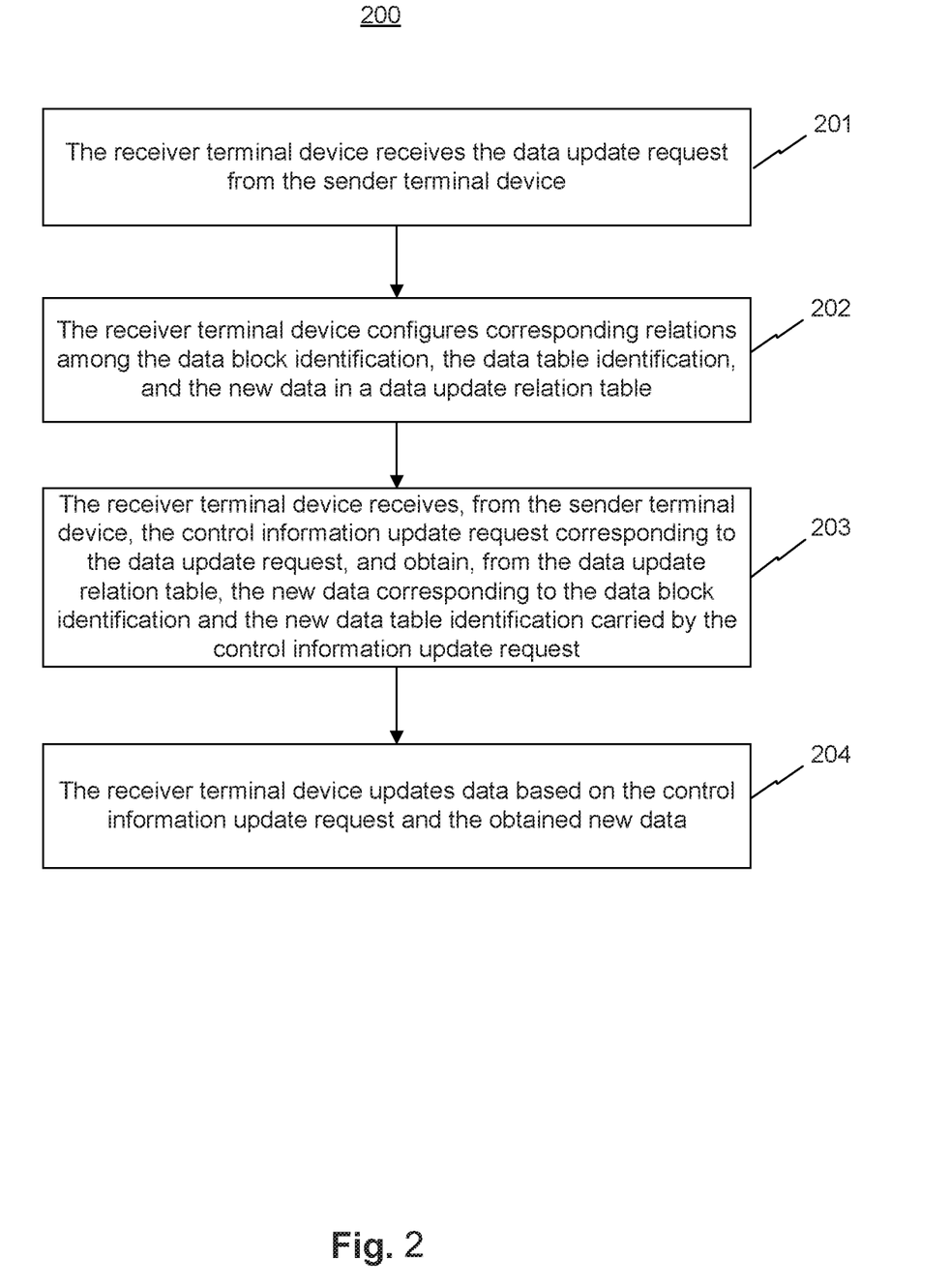
FIG. 2 is a flow diagram illustrating another method for updating data in a distributed storage system, according to an exemplary embodiment.

FIG. 2 is a flow diagram illustrating another method 200 for updating data in a distributed storage system, according to an exemplary embodiment.

At step 201, the receiver terminal device receives the data update request from the sender terminal device.

At step 202, the receiver terminal device configures/sets corresponding relations among the data block identification, the new data table identification, and the new data in a data update relation table.

For example, the received data update request comprises the data block identification, the new data table identification, and the new data. The new data table identification may be configured by the sender terminal device to uniquely identify the data update request, while the sender terminal device is sending the data update request. Exemplary relations among the data block identification, the new data table identification, and the new data are illustrated in the following data update relation table. The receiver terminal device may configure/set, in the data update relation table: corresponding relations among data block identification 1, new data table identification 1.0, and new data 1 carried by data update request 1; corresponding relations among data block identification 1, new data table identification 1.1, and new data 2 carried by data update request 2; corresponding relations among data block identification 1, new data table identification 1.2, and new data 3 carried by data update request 3; and corresponding relations among data block identification 1, new data table identification 1.3, and new data 4 carried by data update request 4.

| Data block identification | New data table identification | New data |
|---|---|---|
| 1 | 1.0 | New data 1 |
| 1 | 1.1 | New data 2 |
| 1 | 1.2 | New data 3 |
| 1 | 1.3 | New data 4 |

In some embodiments, the receiver terminal device may delete the corresponding relation(s), in the data update relation table, or cleanup invalid update data. Deleting the corresponding relation(s) may be achieved through at least one of the following methods.

Method 1: when configuring/setting the corresponding relations among the data block identification, the new data table identification, and the new data, the receiver terminal device sets a timer for the corresponding relations and deletes the corresponding relations from the data update relation table when the timer expires.

Method 2: when configuring/setting the corresponding relations among the data block identification, the new data table identification, and the new data, the receiver terminal device sets a timer for the corresponding relations. When a memory space used by the receiver terminal device for the data update relation table exceeds a predetermined threshold, the receiver terminal device deletes a corresponding relation that consumes most of the memory space or a corresponding relation established earliest in the data update relation table.

Method 3: when configuring/setting the corresponding relations among the data block identification, the new data table identification, and the new data, the receiver terminal device sets a timer for the corresponding relations. When the timer expires. the receiver terminal device deletes the corresponding relations from the data update relation table. When a memory space used by the receiver terminal device for the data update relation table exceeds a predetermined threshold, the receiver terminal device deletes a corresponding relation that consumes most of the memory space or a corresponding relation established earliest in the data update relation table.

At step 203, the receiver terminal device receives, from the sender terminal device, the control information update request corresponding to the data update request, and obtain, from the data update relation table, the new data corresponding to the data block identification and the new data table identification carried by the control information update request.

The receiver terminal device may receive the control information carried by the control information update request. The control information update request corresponding to the data update request may correspond to the control information, along with the update data of the data update request, carried by the data update request. The data block identification/new data table identification carried by the control information update request may be the data block identification/new data table identification carried by the data update request. After sending the data update request, the sender terminal device may save the new data table identification to the table of sent items. When sending the control information update request, the sender terminal device may retrieve the new data table identification from the table of sent items. For example, the control information update request may carry new data table identifications 1.0, 1.1, 1.2, and 1.3, and the data block identification 1. The new data received by the receiver terminal device, based on the new data table identification and the data block, is new data 1, new data 2, new data 2, and new data 4.

In some embodiments, a control information update request may correspond to multiple data update requests. A control information update request may comprise multiple new data table identifications. Thus, multiple pieces of new data may be obtained based on data block identification(s) and new data table identification(s) of a control information update request.

At step 204, the receiver terminal device updates data based on the control information update request and the obtained new data.

The receiver terminal device may restore the control information update request and the obtained new data to a restored update request and may update the data based on the restored update request. In some embodiments, the receiver terminal device responds to the sender terminal device after finishing the data update, e.g., by sending a message/signal of completion.

Consistent with the exemplary embodiments of this disclosure, the receiver terminal device may receive the data update request from the sender terminal device. The receiver terminal device may configure/set, in the data update relation table, corresponding relations among the data block identification, the new data table identification, and the new data, carried by the data update request. The receiver terminal device may receive, from the sender terminal device, the control information update request corresponding to the data update request. The receiver terminal device may obtain, from the data update relation table, the new data corresponding to the data block identification and the new data table identification carried by the control information update request. The receiver terminal device may update the data based on the obtained new data and the control information update request. By sending the update data of the update request while the receiver terminal device updates the data, this method can significantly lower wait time in transferring data during updates, therefore lowering update delay time and enhancing system performances.

Figure 3:
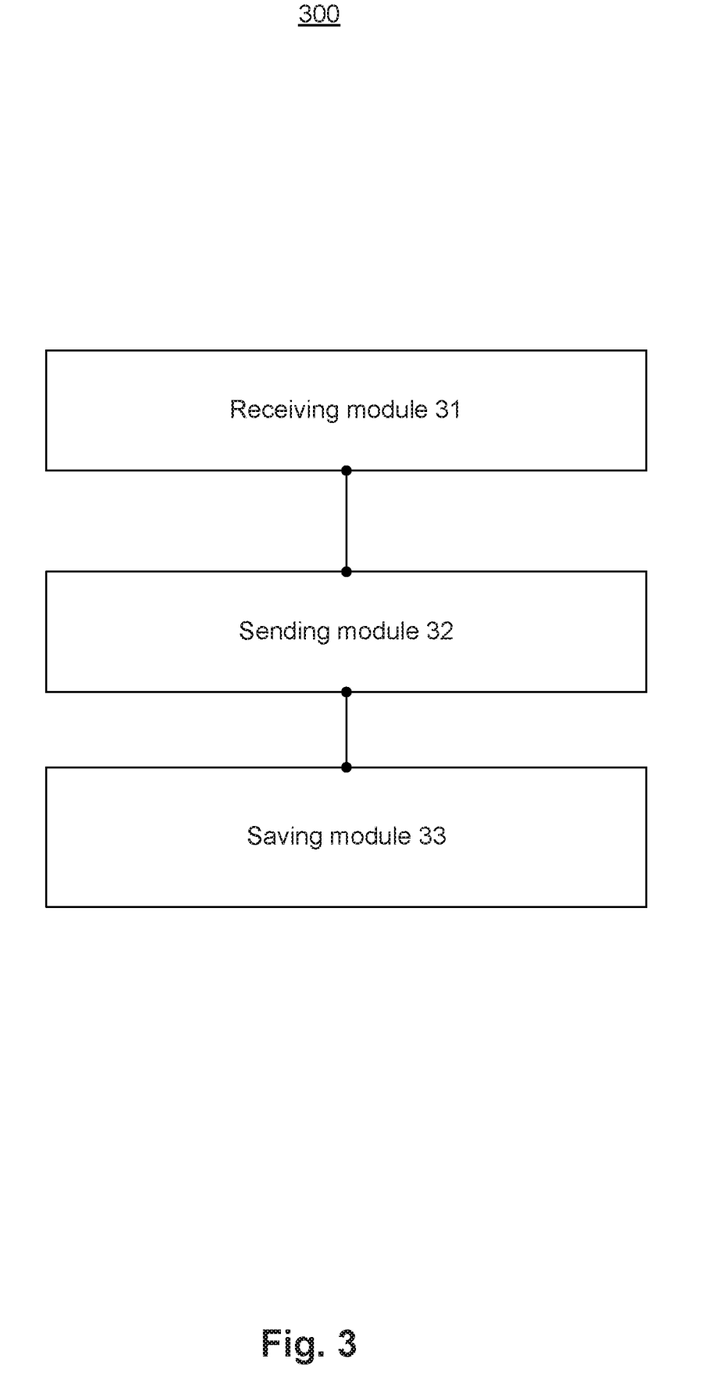
FIG. 3 is a block diagram illustrating an apparatus for updating data in a distributed storage system, according to an exemplary embodiment.

FIG. 3 is a block diagram illustrating an apparatus 300 for updating data in a distributed storage system, according to an exemplary embodiment. Apparatus 300 may comprise a number of components, some of which are optional. Apparatus 300 may be the sender terminal device described above. Apparatus 300 may include a receiving module 31, sending module 32, and a saving module 33.

Receiving module 31 may be configured to receive an update request and to obtain update data and control information from the update request. The update request may include a data block identification. Receiving module 31 may be configured to obtain the update data and the control information, when the sender terminal device determines that a number of update requests corresponding to the data block exceeds a predetermined threshold.

Sending module 32 may be configured to send the update data, via a data update request, to a receiver terminal device. Sending module 32 may also be configured to send the control information, via a control information update request, to the receiver terminal device.

Saving module 33 may be configured to save the new data table identification to the table of sent items, and to retrieve the new data table identification from the table of sent items.

Consistent with exemplary embodiments of this disclosure, the sender terminal device can receive the update request and obtain update data and control information from the update request. The sender terminal device may send the update data, via a data update request, to the receiver terminal device. The sender terminal device may send the control information, via a control information update request, to the receiver terminal device. The update data and the control information may be sent together or separately. By sending the update data of the update request to the receiver terminal device while data is updated in the receiver terminal device, this method can significantly lower wait time in transferring data during updates, therefore lowering update delay time and enhancing system performances.

Figure 4:
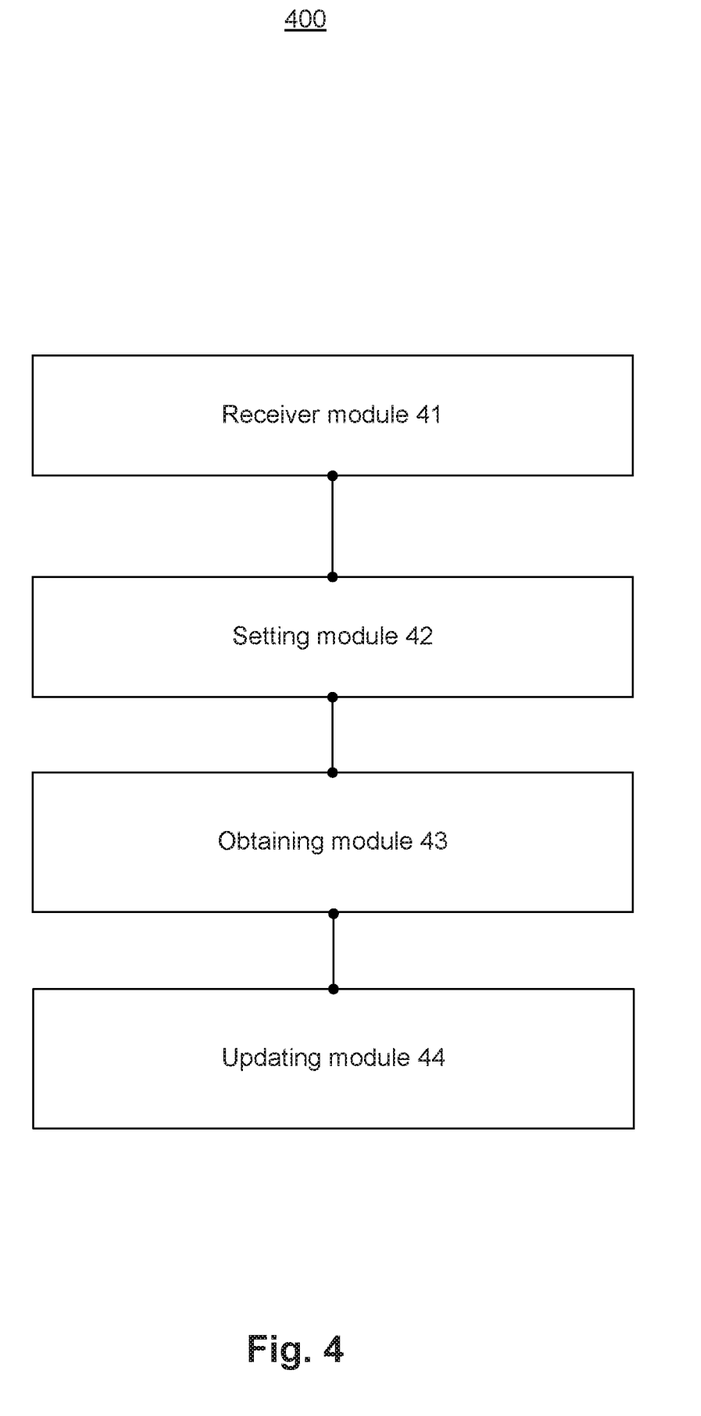
FIG. 4 is a block diagram illustrating another apparatus for updating data in a distributed storage system, according to an exemplary embodiment.

FIG. 4 is a block diagram illustrating another apparatus 400 for updating data in a distributed storage system, according to an exemplary embodiment. Apparatus 400 may comprise a number of components, some of which are optional. Apparatus 400 may be the receiver terminal device described above. Apparatus 400 may include a receiver module 41, setting module 42, obtaining module 43, and updating module 44.

Receiver module 41 may be configured to receive the data update request from the sender terminal device.

Setting module 42 may be configured to configure/set corresponding relations among the data block identification, the new data table identification, and the new data in a data update relation table.

In some embodiments, setting module 42 may also be configured to delete the corresponding relation(s), in the data update relation table, or cleanup invalid update data. Deleting the corresponding relation(s) may be achieved through at least one of the following methods.

Method 1: when configuring/setting the corresponding relations among the data block identification, the new data table identification, and the new data, setting module 42 sets a timer for the corresponding relations and deletes the corresponding relations from the data update relation table when the timer expires.

Method 2: when configuring/setting the corresponding relations among the data block identification, the new data table identification, and the new data, setting module 42 sets a timer for the corresponding relations. When a memory space used by the receiver terminal device for the data update relation table exceeds a predetermined threshold, setting module 42 deletes a corresponding relation that consumes most of the memory space or a corresponding relation established earliest in the data update relation table.

Method 3: when configuring/setting the corresponding relations among the data block identification, the new data table identification, and the new data, setting module 42 sets a timer for the corresponding relations. When the timer expires, setting module 42 deletes the corresponding relations from the data update relation table. When a memory space used by the receiver terminal device for the data update relation table exceeds a predetermined threshold, setting module 42 deletes a corresponding relation that consumes most of the memory space or a corresponding relation established earliest in the data update relation table.

Receiving module 41 may also be configured to receive, from the sender terminal device, the control information update request corresponding to the data update request.

Obtaining module 43 may be configured to obtain, from the data update relation table, the new data corresponding to the data block identification and the new data table identification carried by the control information update request.

Updating module 44 may be configured to update data based on the control information update request and the obtained new data.

Updating module 44 may also be configured to restore the control information update request and obtained new data to a restored update request and to update the data based on the restored update request.

Consistent with the exemplary embodiments of this disclosure, the receiver terminal device may receive the data update request from the sender terminal device. The receiver terminal device may configure/set, in the data update relation table, corresponding relations among the data block identification, the new data table identification, and the new data, carried by the data update request. The receiver terminal device may receive, from the sender terminal device, the control information update request corresponding to the data update request. The receiver terminal device may obtain, from the data update relation table, the new data corresponding to the data block identification and the new data table identification carried by the control information update request. The receiver terminal device may update the data based on the obtained new data and the control information update request. By sending the update data of the update request while the receiver terminal device updates the data, this method can significantly lower wait time in transferring data during updates, therefore lowering update delay time and enhancing system performances.

A person skilled in the art can further understand that various exemplary logic blocks, modules, circuits, and algorithm steps described with reference to the disclosure herein may be implemented as electronic hardware, computer software, or a combination of electronic hardware and computer software. For example, the modules/apparatus and corresponding steps may be implemented by a processor executing software instructions stored in the computer readable medium. The apparatus/terminal device may be a mobile phone, a personal computer, a server, or an internet device that implements the methods/steps described above.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or a part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment, or an embodiment combining software and hardware. Furthermore, embodiments of the present disclosure may take the form of a computer program product embodied in one or more computer available storage media (including but not limited to a magnetic disk memory, a CD-ROM, an optical memory and so on) containing computer available program codes.

Embodiments of the present disclosure are described with reference to flow diagrams and/or block diagrams of methods, devices (systems) and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer readable memory that can direct a computer or other programmable data processing devices to function in a particular manner, such that the instructions stored in the computer readable memory produce a manufactured product including an instruction means which implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions, which are executed on the computer or other programmable devices, provide steps for implementing the functions specified in one or more flows in the flow diagrams and/or one or more blocks in the block diagrams. In a typical configuration, a computer device includes one or more Central Processing Units (CPUs), an input/output interface, a network interface and a memory. The memory may include forms of a volatile memory, a random access memory (RAM) and/or non-volatile memory and the like, such as a read-only memory (ROM) or a flash RAM in a computer readable medium. The memory is an example of the computer readable medium.

The computer readable storage medium refers to any type of physical memory on which information or data readable by a processor may be stored. Thus, a computer readable storage medium may store instructions for execution by one or more processors, including instructions for causing the processor(s) to perform steps or stages consistent with the embodiments described herein. The computer readable medium includes non-volatile and volatile media, removable and non-removable media, wherein information storage can be implemented with any method or technology. Information may be modules of computer readable instructions, data structures and programs, or other data. Examples of a computer storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage, other magnetic storage devices, or any other non-transmission media which may be used to store information capable of being accessed by a computer device. The computer readable medium is non-transitory, and does not include transitory media, such as modulated data signals and carrier waves.

The specification has described methods, apparatus, and systems for updating data in a distributed storage system. The illustrated steps are set out to explain the exemplary embodiments shown, and it should be anticipated that ongoing technological development will change the manner in which particular functions are performed. Thus, these examples are presented herein for purposes of illustration and not limitation. For example, steps or processes disclosed herein are not limited to being performed in the order described but may be performed in any order, and some steps may be omitted consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," "including," and other similar forms, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for updating stored data in a distributed storage system, the method performed by a sender terminal device and comprising:
   receiving, by the sender terminal device, a first update request to update a data block stored in a receiver terminal device with first sub-data;
   receiving a second update request to update the data block stored in the receiver terminal device with second sub-data, wherein both the first sub-data and the second sub-data belong to the data block;
   obtaining, from the first and second update requests, update data including the first sub-data and the second sub-data and first control information of the first update request and the second control information of the second update request;
   sending the update data including the first sub-data and the second sub-data, via one or more data update requests, to the receiver terminal device and
   after sending the update data via the one or more data update requests, sending the first and second control information, via a control information update request, to the receiver terminal device.

2. The method of claim 1, wherein the receiver terminal device is configured to:
   set corresponding relations among a data block identification, a new data table identification, and new data in a data update relation table;
   obtain the new data corresponding to the data block identification and the new data table identification carried by the control information update request, wherein the obtained new data includes the first sub-data and the second sub-data; and
   update the data based on the control information update request and the obtained new data.

3. The method of claim 2, before sending the first and second control information, via the control information update request, to the receiver terminal device, further comprising:
   saving, by the sender terminal device, the new data table identification, carried by the one or more data update requests, to a table of sent items; and
   retrieving, by the sender terminal device, the new data table identification from the table of sent items.

4. The method of claim 1, wherein sending the update data, via the one or more data update requests, to the receiver terminal device comprises:
   sending, by the sender terminal device, the first and second sub-data of multiple pieces of sub-data to the receiver terminal device via respective multiple data update requests, the update data including the first and second sub-data of multiple pieces of sub-data and the multiple data update requests carrying corresponding new data table identifications.

5. The method of claim 1, wherein obtaining the update data and the first and second control information from the first and second update requests comprises obtaining, by the sender terminal device, the update data and the first and second control information when the sender terminal device determines that a number of update requests corresponding to the data block exceeds a predetermined threshold.

6. A method for updating stored data in a distributed storage system, the method performed by a receiver terminal device and comprising:
   receiving one or more data update requests from a sender terminal device, wherein the one or more data update requests include update data including a first sub-data for updating a data block and a second sub-data for updating the data block, and both the first sub-data and the second sub-data belong to the data block;
   setting corresponding relations among a data block identification, new data table identifications associated with the first and second sub-data, and new data including the first and second sub-data in a data update relation table;
receiving a control information update request corresponding to the one or more data update requests from the sender terminal device;
obtaining the new data corresponding to the data block identification and the new data table identifications carried by the control information update request from the data update relation table; and
updating the data block based on the control information update request and the obtained new data, wherein the receiver terminal device comprises the data block.

7. The method of claim 6, wherein updating the data block based on the control information update request and the obtained new data comprises:
restoring the control information update request and the obtained new data to a restored update request; and
updating the data based on the restored update request.

8. The method of claim 6, after setting the corresponding relations among the data block identification, the new data table identifications, and the new data in the data update relation table, further comprising at least one of:
setting, by the receiver terminal device, a timer for the corresponding relations, and deleting, by the receiver terminal device, the corresponding relations from the data update relation table when the timer expires; or
setting, by the receiver terminal device, a timer for the corresponding relations and deleting, by the receiver terminal device, a corresponding relation that consumes most of the memory space or a corresponding relation established earliest in the data update relation table, when a memory space used by the receiver terminal device for the data update relation table exceeds a predetermined threshold.

9. An apparatus, implemented as a sender terminal device, for updating stored data in a distributed storage system, the apparatus comprising:
a receiving module configured to:
receive a first update request to update a data block stored in a receiver terminal device with first sub-data,
receive a second update request to update the data block with second sub-data, wherein both the first sub-data and the second sub-data belong to the data block, and
obtain, from the first and second update requests, update data including the first sub-data and the second sub-data and first control information of the first update request and second control information of the second update request; and
a sending module configured to:
send the update data, including the first sub-data and the second sub-data via one or more data update requests to the receiver terminal device, wherein the receiver terminal device comprises the data block; and
send, after the update data is sent, the first and second control information, via a control information update request, to the receiver terminal device.

10. The apparatus of claim 9, wherein the receiver terminal device is configured to:
set corresponding relations among a data block identification, a new data table identification, and new data in a data update relation table;
obtain the new data corresponding to the data block identification and the new data table identification carried by the control information update request, wherein the obtained new data includes the first sub-data and the second sub-data; and
update the data based on the control information update request and the obtained new data.

11. The apparatus of claim 10, further comprising:
a saving module configured to save the new data table identification, carried by the one or more data update requests, to a table of sent items and to retrieve the new data table identification from the table of sent items.

12. The apparatus of claim 9, wherein:
the sending module is configured to respectively send the first and second sub-data of multiple pieces of sub-data to the receiver terminal device via respective multiple data update requests,
wherein the multiple data update requests carry corresponding new data table identifications.

13. The apparatus of claim 9, wherein:
the first and second update requests include a data block identification; and
the receiving module is further configured to receive the update data and the control information, when the sender terminal device determines that a number of update requests corresponding to the data block exceeds a predetermined threshold.

14. A non-transitory computer-readable medium storing one or more programs, the one or more programs comprising instructions which, when executed by a processor of a sender terminal device, cause the sender terminal device to perform a method for updating stored data in a distributed storage system, the method comprising:
receiving, a first update request to update a data block stored in a receiver terminal device with first sub-data;
receiving a second update request to update the data block stored in the receiver terminal device with second sub-data, wherein both the first sub-data and the second sub-data belong to the data block;
obtaining, from the first and second update requests, update data including the first sub-data and the second sub-data and first control information of the first update request and second control information of the second update request;
sending, the update data including the first sub-data and the second sub-data, via one or more data update requests, to the receiver terminal device; and
after sending the update data, sending, the first and second control information, via a control information update request, to the receiver terminal device.

15. The non-transitory computer-readable medium of claim 14, wherein the identified receiver terminal device is configured to:
set corresponding relations among a data block identification, a new data table identification, and new data in a data update relation table;
obtain the new data corresponding to the data block identification and the new data table identification carried by the control information update request, wherein the obtained new data includes the first sub-data and the second sub-data; and
update the data based on the control information update request and the obtained new data.

16. The non-transitory computer-readable medium of claim 15, before sending the control information, via the control information update request to the receiver terminal device, further comprising:

saving, the new data table identification, carried by the one or more data update requests, to a table of sent items; and retrieving, the new data table identification from the table of sent items.

17. The non-transitory computer-readable medium of claim 15, wherein sending the update data, via the data update request, to the receiver terminal device comprises:

sending, by the sender terminal device, the first and second sub-data of multiple pieces of sub-data to the receiver terminal device via respective multiple data update requests, the update data including the first and second sub-data of multiple pieces of sub-data and the multiple data update requests carrying corresponding new data table identifications.

18. The non-transitory computer-readable medium of claim 14, wherein obtaining the update data and the control information from the update request comprises obtaining, by the sender terminal device, the update data and the control information when the sender terminal device determines that a number of update requests corresponding to the data block exceeds a predetermined threshold.

* * * * *